United States Patent Office 3,565,640
Patented Feb. 23, 1971

3,565,640
STRAP FOR HANGING SAUSAGES
Jorgen Dohlmann, Gl. Vallerodgaard,
2960 Rungsted Kyst, Denmark
Filed Nov. 29, 1968, Ser. No. 779,894
Claims priority, application Denmark, Nov. 30, 1967,
6,016/67
Int. Cl. A22b 15/00
U.S. Cl. 99—175              1 Claim

ABSTRACT OF THE DISCLOSURE

Strap for hanging sausages, comprising a plastic string in the form of an endless loop, a stem projecting from said loop and a thickening at the free end of the stem; the loop, the stem and the thickening being integrally moulded.

---

The invention relates to a sausage strap to be fixed to the one end of a sausage and comprising a loop of plastic wire as well as a thickening.

From the German patent specification No. 964,570 a sausage strap of this kind is known in which the loop and the thickening are obtained by tying the ends of the plastic wire together into a knot. The knot is intended to be fitted into a capsule that is clamped around the end of the sausage skin.

By the present invention it is intended to provide a sausage strap that is simpler and cheaper to manufacture and easier to fix than the known sausage strap and which, moreover, is more secure.

In order to achieve this, the sausage strap according to the invention is characterized in that the loop is constituted of an endless ring made of a plastic string, of approximately circular or oval shape, from which projects a stem which, at its free end has the said, preferably spherical thickening, and that the ring, the stem and the thickening are moulded integrally. In this case, the time-consuming tying together of the ends of the plastic wire is avoided and the stem provided with the thickening is much easier to introduce underneath a holding member than the tied knot in the known design. Besides, the sausage strap according to the invention can be secured by means of a simple clip, whereas the known sausage strap has to be secured by a capsule in which the knot is placed and by means of which it is prevented from becoming undone. Finally, the ring made of plastic string ensures that the loop does not curl up, as is frequently the case with loops made of twisted wire. This makes it particularly easy to hang up a sausage on a hook or a pole.

Figure 1:
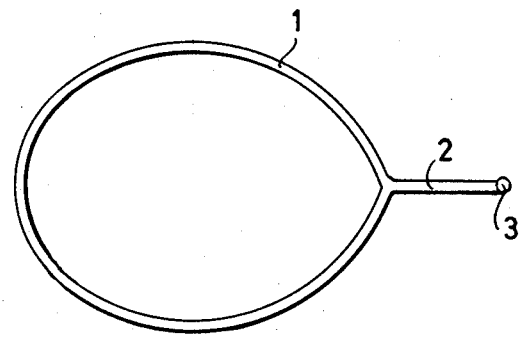

In the following the invention is described in greater detail while referring to the diagrammatical drawing, in which:

FIG. 1 shows a sausage strap according to the invention and

Figure 2:
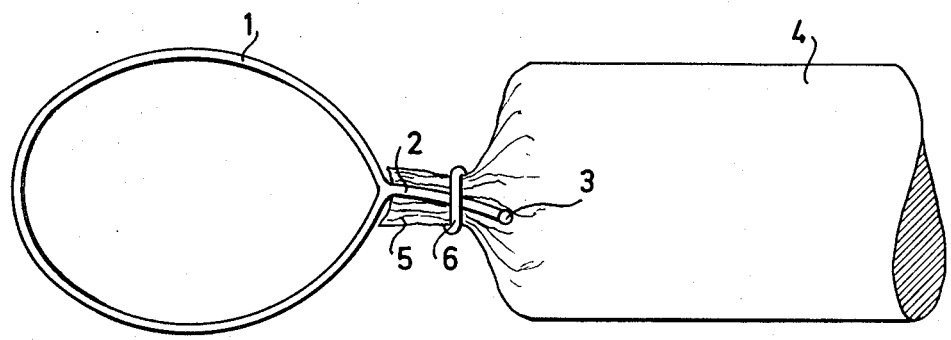

FIG. 2 a part of a sausage with such a sausage strap.

The sausage strap shown, which preferably is made of an elastic plastic, has a first part 1, which constitutes an endless loop or ring. From this loop projects a stem 2 which terminates in a spherical thickening 3.

In FIG. 2 such a sausage strap is shown fixed to the one end of a sausage 4, the sausage skin 5 of which is gathered by means of a clip 6. The stem 2 is tucked in under the clip and the thickening 3 prevents the sausage strap from being pulled out from under the clip.

On account of the material and shape of the strap it will always be easy to hang up the sausage, for instance on a hook or a pole, since the loop is open when it is not subjected to external influences.

The sausage strap may be manufactured of material other than the one mentioned above, provided that this material has the property of producing, on its own, the open shape of the loop, when the loop is not affected by external forces.

The thickening may have a shape different from the one shown, e.g. that of a barb.

The loop proper may have a different shape from the shown oval one; it may be circular for instance. Other shapes too, are possible, e.g. rectangular, square or triangular ones.

What I claim is:
1. A sausage package comprising:
  (A) a sausage casing,
  (B) a gathered end on said sausage casing,
  (C) a sausage hanger consisting essentially of:
    (a) a monofilament stem portion,
    (b) a ball-shaped portion upon one end of said stem portion, and
    (c) a closed monofilament loop having a peripheral length substantially greater than the length of said stem portion upon the other end of said stem portion,
    (d) said stem portion, closed loop and ball-shaped portion being formed integrally of the same plastic material, and
  (D) a clip holding said gathered end in gathered form with said stem portion of said hanger tucked under said clip against said gathered end, said ball-shaped portion preventing said hanger from being pulled out from under said clip.

References Cited

UNITED STATES PATENTS

| | | | |
|---|---|---|---|
| 2,749,637 | 6/1956 | Bradshaw | 161—16 |
| 2,825,521 | 3/1958 | Nesset et al. | 248—318 |
| 3,007,666 | 11/1961 | Hamel | 17—44.2X |
| 3,175,243 | 3/1965 | Weber | 16—87.4 |
| 3,302,917 | 2/1967 | Winkler | 248—359X |
| 3,401,042 | 9/1968 | Frederick et al. | 17—44.2X |

ROY D. FRAZIER, Primary Examiner

J. F. FOSS, Assistant Examiner

U.S. Cl. X.R.

17—44.2; 24—73; 248—317